(No Model.)
W. L. MINZEY.
ARTIFICIAL ARM AND HAND.
No. 493,440. Patented Mar. 14, 1893.
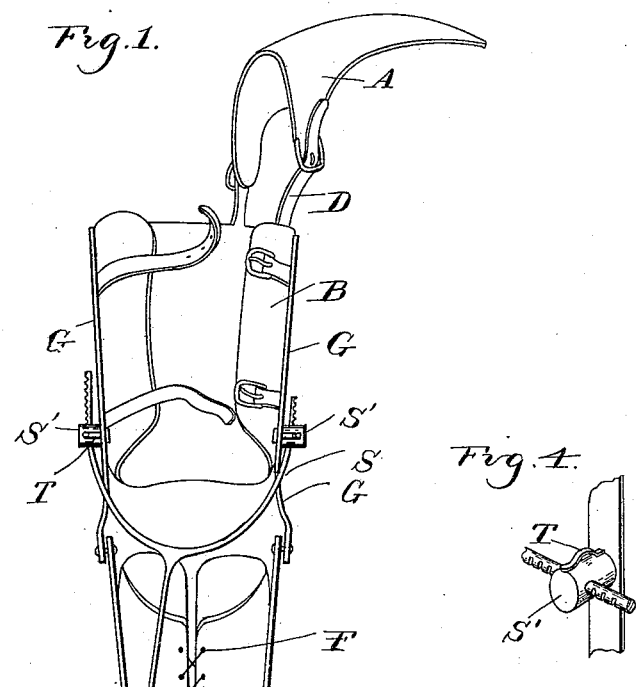
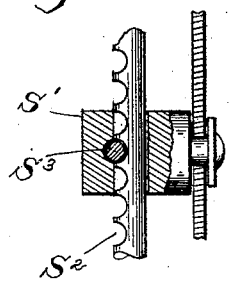
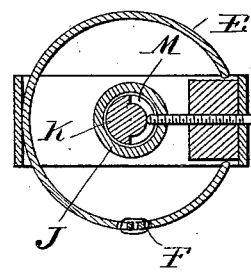
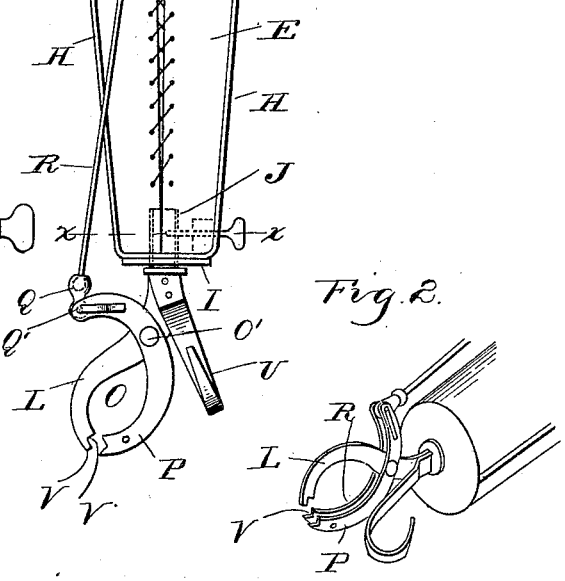
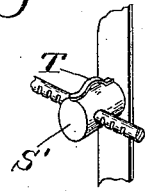
Witnesses
A. L. Hobbie
Thos. S. Dogherty
Inventor
William L. Minzey
By Thos. S. Sprague & Son
Attys.

UNITED STATES PATENT OFFICE.

WILLIAM L. MINZEY, OF BELLEVIEW, ASSIGNOR OF ONE-HALF TO HENRY SCHENCK, OF PERKINS, OHIO.

ARTIFICIAL ARM AND HAND.

SPECIFICATION forming part of Letters Patent No. 493,440, dated March 14, 1893.

Application filed October 1, 1892. Serial No. 447,564. (No model.)

*To all whom it may concern:*

Be it known that I, WILLIAM L. MINZEY, a citizen of the United States, residing at Belleview, in the county of Huron and State of Ohio, have invented certain new and useful Improvements in Artificial Hands and Arms, of which the following is a specification, reference being had therein to the accompanying drawings.

This invention relates to new and useful improvements in artificial arms, and hands, and refers more specifically to that class of artificial arms adapted to be used in cases of amputation below the elbow.

The invention consists in the peculiar construction, arrangement and combination of the artificial hand or claw, and means for actuating the same, and further in the peculiar construction, arrangement and combination of the various parts, all as more fully hereinafter described.

In the drawings, Figure 1 is an elevation of my improved arm and hand. Fig. 2 is a perspective view of the hand or claw. Fig. 3 is a cross section on line $x\ x$ in Fig. 1. Fig. 4 is a detached perspective view of the swivel joint for the connecting rod from the upper arm to the claw, and Fig. 5 is a section through that swiveled joint.

A is a shoulder strap.

B is the socket for the upper arm connected to the shoulder strap by means of the securing strap. This socket B may be of any desired construction and is provided with securing means such as the straps D for holding it upon the upper arm.

E is the socket for the lower arm preferably made in two like halves and provided with lacing apertures F through which a lacing string may be passed to secure it to the lower arm. The sockets B and E are provided upon the sides with the straps G and H which are pivoted together at their meeting ends and form the elbow joint between the two arm sections. When thus secured upon the arm it is evident that all the movements of the forearm will carry with it the socket E.

At the lower end of the socket E is an end plate I centrally apertured and provided with a socket J in which the shank K of the stationary jaw L engages. The shank K is provided with a semi-circular groove M in which the end of the set screw N engages, preventing endwise displacement of the shank and limiting it to a half rotation of the shank, K.

O is the movable jaw consisting of the two plates P secured together at the upper end and embracing the stationary jaw L, being pivoted thereto by the pin O'.

Between the inner ends of the two plates P is the block Q pivoted upon a spring pin Q'. The block Q is provided with a suitable socket to receive the ball formed on the end of the connecting rod R forming a ball and socket joint. The connecting rod R is of spring metal and at its upper end connects with and is preferably made integral with the bail S which spans the arm at the elbow joint, and engages into apertures in the swiveled blocks S' pivoted in the bars G at the sides. The ends of the bail are provided with notches $S^2$ in which a pin $S^3$ is adapted to engage as shown in Fig. 5 to hold them in their adjusted position, these pins being formed upon the ends of springs T to allow of adjusting the ends of the bail through the blocks S'.

U is a hook riveted onto the shank of the stationary jaw L. The stationary jaw L and the movable jaw O are provided with marginal teeth V between which are oppositely arranged grooves or notches V'.

The parts being thus constructed their operation is as follows: In placing the arm in position the upper socket B and lower socket E are secured in position and the connecting rod R is adjusted as to length by releasing the pins $S^3$ and drawing down the bail or pushing it up through the apertures in the swiveled blocks S'. It may also be adjusted in angular relation to the claw, as shown in Fig. 1 by adjusting one end of the bail more than the other. To open or separate the jaws the arm is moved into its bent position when the connecting rod will be forced outward turning the movable jaw upon its pivot and moving its outer end away from the outer end of the stationary arm; as the arm is straightened out, the jaws will close and tightly clasp the desired object between them, the marginal teeth V and notches V' at the end of the jaws allowing it to grasp tightly small objects such as a lead pencil which cannot be done with jaws of other construction. The bail S giving a support for the connecting pin upon both sides of the arm prevents possibility of its twisting and thereby the turning of the hand beyond the desired position in handling any object. At the same time the flexibility of the connecting rod together with the swiveled blocks and the ball and socket joint at the end of the connecting rod allows me to give any necessary turn to the claw. By withdrawing the spring pin Q' and disengaging the screw N from the groove M the claw may be detached and any other tool placed in the socket J.

What I claim as my invention is—

1. In an artificial hand and arm, the combination of the upper and forearm sockets hinged together, the claw at the end of the forearm socket, the connecting rod secured to the movable jaw at one end, and to a bail at the other end, said bail being pivotally secured to opposite sides of the upper arm socket, substantially as described.

2. In an artificial hand and arm, the combination of the upper and forearm socket hinged together, the claw at the end of the forearm socket, the connecting rod secured to the movable jaw at one end and to a bail at the other end, and pivoted blocks at opposite sides of the upper socket in which the ends of said bail are adjustably secured, substantially as described.

3. In an artificial hand and arm, the combination of the upper and forearm sockets hinged together, the swiveled claw at the end of the forearm socket, the connecting rod having a ball and socket connection at one end with the movable jaw of the claw, and a bail at the other end adjustably connected with pivoted blocks at opposite sides of the upper arm sections, substantially as described.

4. In an artificial hand and arm, the combination of the upper and fore arm sockets hinged together, the apertured pivoted blocks at opposite sides of the lower end of the upper arm socket, a bail having its ends engaging the apertures in said blocks, and notched on the side, of a spring pin in each block adapted to engage the notches, a claw at the end of the forearm socket and a connecting rod from the movable jaw of the claw to the bail, substantially as described.

In testimony whereof I affix my signature in presence of two witnesses.

WILLIAM L. MINZEY.

Witnesses.
HENRY SCHENCK,
JOHN TRAUB.